(12) United States Patent
Miyazawa

(10) Patent No.: US 12,504,842 B2
(45) Date of Patent: *Dec. 23, 2025

(54) INPUT SYSTEM

(71) Applicant: Wacom Co., Ltd., Saitama (JP)

(72) Inventor: Hiroshi Miyazawa, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/657,459

(22) Filed: May 7, 2024

(65) Prior Publication Data

US 2024/0288964 A1 Aug. 29, 2024

Related U.S. Application Data

(63) Continuation of application No. 18/337,913, filed on Jun. 20, 2023, now Pat. No. 12,014,001, which is a
(Continued)

(51) Int. Cl.
G06F 3/041 (2006.01)
G06F 3/0354 (2013.01)
(Continued)

(52) U.S. Cl.
CPC ...... *G06F 3/04162* (2019.05); *G06F 3/03545* (2013.01); *G06F 3/04883* (2013.01);
(Continued)

(58) Field of Classification Search
CPC .. G06F 3/04883; G06F 3/0416; G06F 3/0412; G06F 3/04162; G06F 3/03545;
(Continued)

(56) References Cited

U.S. PATENT DOCUMENTS

| 5,408,604 A | 4/1995 | Oeda et al. |
| 9,652,091 B1 | 5/2017 | Obeidat |

(Continued)

FOREIGN PATENT DOCUMENTS

| CN | 1798248 A | 7/2006 |
| CN | 106708277 A | 5/2017 |

(Continued)

OTHER PUBLICATIONS

Chinese Office Action, dated Jan. 11, 2024, for Chinese Patent Application No. 201880097302.1. (16 pages) (with English translation).

(Continued)

*Primary Examiner* — Koosha Sharifi-Tafreshi
(74) *Attorney, Agent, or Firm* — Seed Intellectual Property Law Group LLP

(57) ABSTRACT

An input system is provided which is capable of mitigating certain inconveniences that may arise due to data processing performed by a host processor. The input system includes a first signal path, a second signal path, and a switch section. The first signal path is used for transmitting a signal from a sensor controller to a display controller through the host processor. The second signal path is used for transmitting a signal from the sensor controller to the display controller without passing the signal through the host processor. The switch section is configured to be able to switch between the first signal path and the second signal path.

14 Claims, 15 Drawing Sheets

Related U.S. Application Data continuation of application No. 17/878,545, filed on Aug. 1, 2022, now Pat. No. 11,714,506, which is a continuation of application No. 17/207,312, filed on Mar. 19, 2021, now Pat. No. 11,402,941, which is a continuation of application No. PCT/JP2018/047664, filed on Dec. 25, 2018.

(51) Int. Cl.
*G06F 3/04883* (2022.01)
*G06F 3/14* (2006.01)
*G06F 21/10* (2013.01)
*G06F 21/60* (2013.01)
*G06T 11/20* (2006.01)
*G06F 21/16* (2013.01)

(52) U.S. Cl.
CPC ............... *G06F 3/14* (2013.01); *G06F 21/10* (2013.01); *G06F 21/602* (2013.01); *G06T 11/203* (2013.01); *G06F 21/16* (2013.01)

(58) Field of Classification Search
CPC ........ G06F 21/82; G06F 21/64; G06F 21/602; G06F 21/10; G06F 3/14; G06F 3/0488; G06F 3/0446; G06F 3/04166; G06T 11/203; G09G 2358/00
See application file for complete search history.

(56) References Cited

U.S. PATENT DOCUMENTS

| | | |
|---|---|---|
| 2006/0132657 A1 | 6/2006 | Lee et al. |
| 2013/0176251 A1 | 7/2013 | Wyatt et al. |
| 2015/0015510 A1 | 1/2015 | Huang |
| 2017/0142245 A1 | 5/2017 | Lin et al. |
| 2017/0242545 A1* | 8/2017 | Kimura ................ G06F 3/0445 |
| 2017/0285845 A1* | 10/2017 | Chien ..................... G09G 3/20 |
| 2018/0060608 A1 | 3/2018 | Holden |
| 2018/0088702 A1 | 3/2018 | Shutzberg et al. |
| 2021/0175282 A1* | 6/2021 | Ikeda ................ G06F 3/04166 |

FOREIGN PATENT DOCUMENTS

| | | |
|---|---|---|
| JP | 5-165598 A | 7/1993 |
| JP | H05244592 A | 9/1993 |
| JP | 2009187260 A | 8/2009 |
| JP | 2018-38036 A | 3/2018 |
| WO | 2014065055 A1 | 5/2014 |

OTHER PUBLICATIONS

International Search Report, mailed Mar. 19, 2019, for International Application No. PCT/JP2018/047664, 2 pages.
Japanese Notice of Reasons for Refusal, dated Feb. 27, 2024, for Japanese Patent Application No. 2023-117976. (8 pages) (with English translation).

\* cited by examiner

FIG. 16
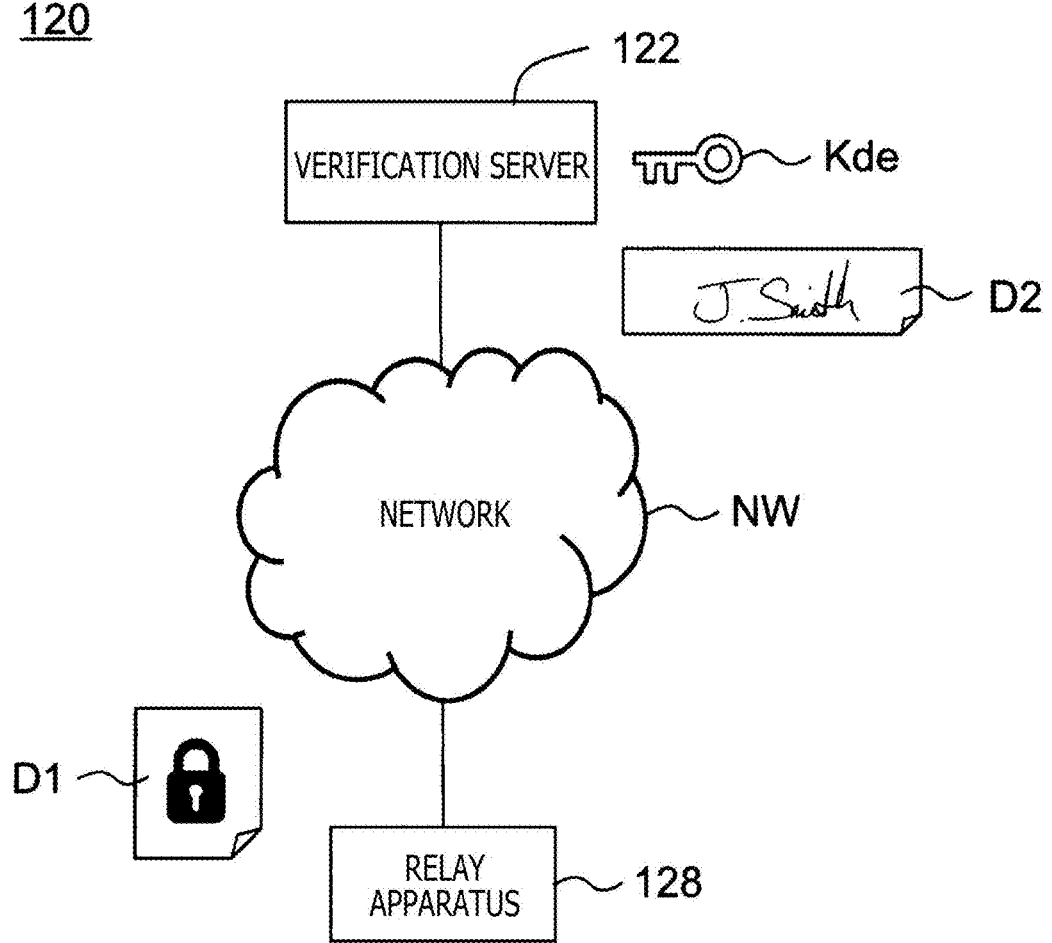
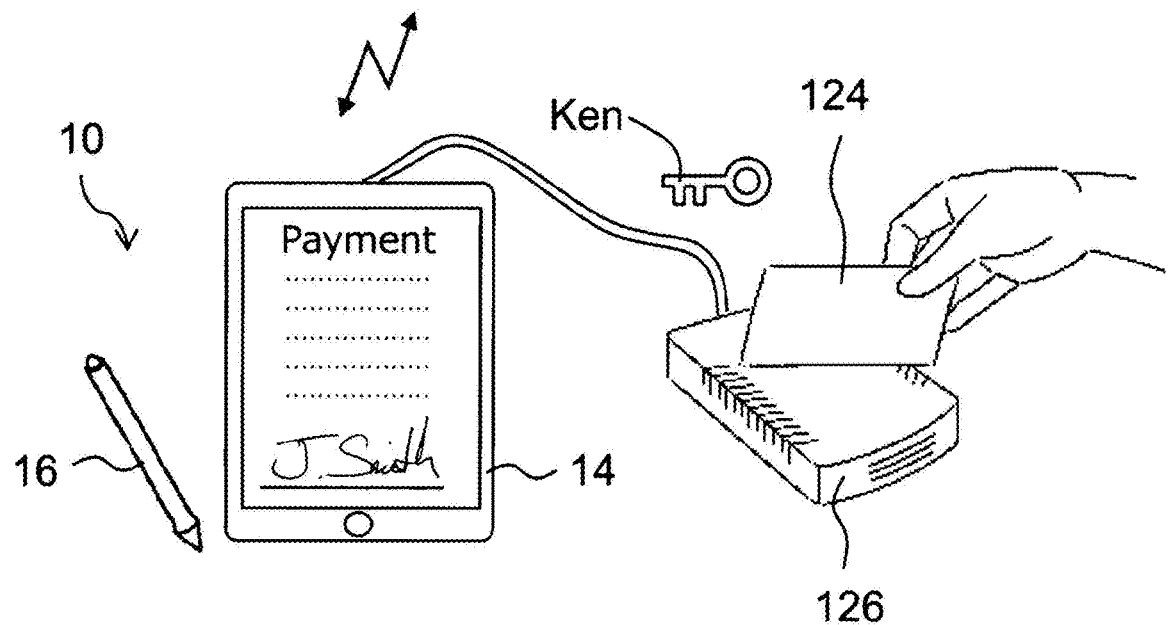

ental or operational
INPUT SYSTEM

BACKGROUND

Technical Field

The present disclosure relates to an input system that uses a touch panel display.

Description of the Related Art

Disclosed in Japanese Patent Laid-open No. 2018-038036 is a method of establishing a transport layer security (TLS) connection between an external server and an electronic apparatus having a touch panel display, and securely communicating data including confidential information.

However, when a host processor of the electronic apparatus is involved to perform processing on data inputted from the touch panel display, certain technical or operational inconveniences may occur due to the involvement of the host processor.

BRIEF SUMMARY

The present disclosure has been made in view of the above circumstances, and provides an input system capable of mitigating certain inconveniences that may arise due to the host processor performing certain data processing.

According to a first aspect of the present disclosure, there is provided an input system that uses a touch panel display, wherein the touch panel display is configured to include a sensor electrode for detecting a position designated by a user in a display area of a display panel. The input system includes a sensor controller, a host processor, a display controller, a first signal path, a second signal path, and a switch section (or a switch circuit). The sensor controller acquires a designated position in the display area according to a result of detection by the sensor electrode. The host processor processes a data signal including the designated position acquired by the sensor controller. The display controller outputs a display signal representing an image or a video to the display panel. The first signal path is used for transmitting a signal from the sensor controller to the display controller through the host processor. The second signal path is used for transmitting a signal from the sensor controller to the display controller without passing the signal through the host processor. The switch section is configured to be able to switch between the first signal path and the second signal path.

According to a second aspect of the present disclosure, there is provided an input system that uses a touch panel display, wherein the touch panel display is configured to include a sensor electrode for detecting a position designated by a user in a display area of a display panel. The input system includes a host processor, a display controller, and a sensor controller. The host processor processes a data signal including the designated position. The display controller is connected to the host processor and used to output a display signal representing an image or a video to the display panel. The sensor controller acquires a designated position in the display area according to a result of detection by the sensor electrode. The sensor controller is physically or logically connected to the host processor and is physically connected to the display controller.

The input system according to the present disclosure mitigates certain inconveniences that may arise due to data processing performed by the host processor.

BRIEF DESCRIPTION OF THE SEVERAL VIEWS OF THE DRAWINGS

FIG. 16 is a diagram illustrating an overall configuration of a signature verification system incorporating the input system depicted in FIG. 1.

DETAILED DESCRIPTION

An input system according to the present disclosure will now be described with reference to the accompanying drawings. It should be noted that the present disclosure is not limited to described embodiments and modifications. It is obvious that the embodiments and modifications may be freely changed without departing from the spirit and scope of the present disclosure. Alternatively, individual configurations may be combined optionally as far as technical inconsistencies are avoided.

Configuration of Input System 10

Overall Configuration

Figure 1:
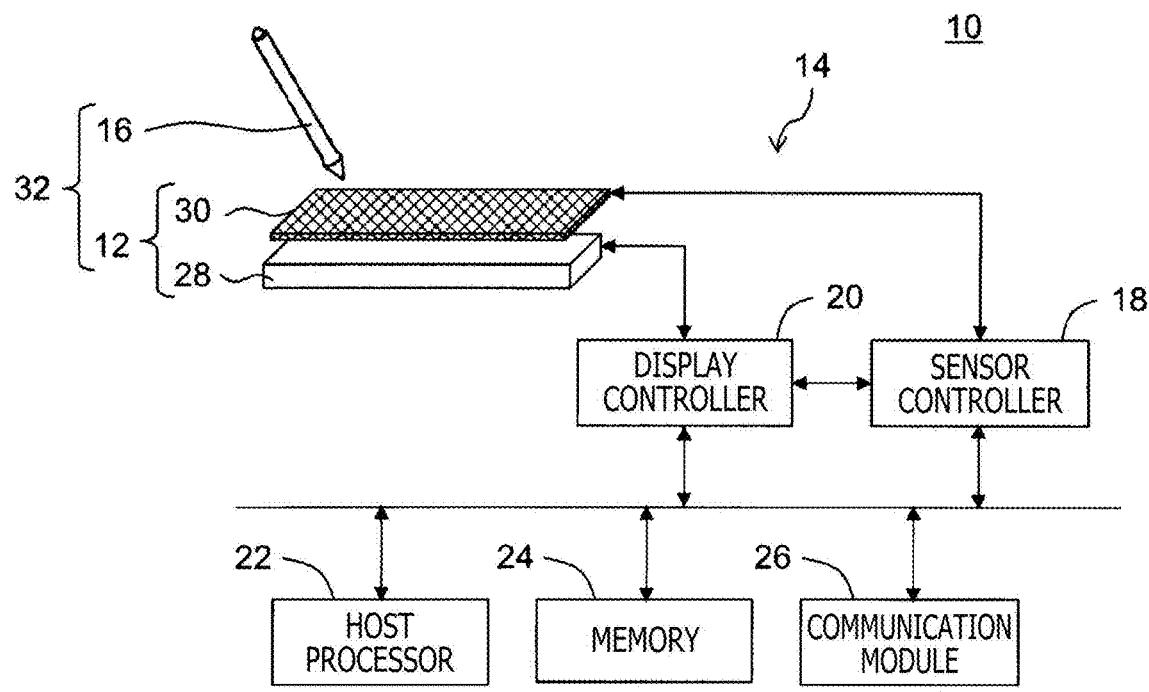
FIG. 1 is a diagram illustrating an overall configuration of an input system that is common to embodiments of the present disclosure.

FIG. 1 is a diagram illustrating an overall configuration of an input system 10 that is common to the embodiments of the present disclosure. The input system 10 basically includes an electronic apparatus 14 and a stylus 16. The electronic apparatus 14 includes a touch panel display 12. The stylus 16 is a pen-shaped pointing device.

The electronic apparatus 14 is, for example, a tablet terminal, a smartphone, or a personal computer. The stylus 16 is configured to be capable of establishing unidirectional or bidirectional communication with the electronic apparatus 14. A user may draw pictures or write letters into the electronic apparatus 14 by holding the stylus 16 with one hand and moving a pen tip of the stylus 16 while pressing the pen tip against the touch surface of the touch panel display 12.

In addition to the touch panel display 12, the electronic apparatus 14 includes a sensor controller 18, a display controller 20, a host processor 22, a memory 24, and a communication module 26.

The touch panel display 12 includes a display panel 28 and a sensor electrode (or electrode array) 30. The display panel 28 is capable of visually displaying content. The sensor electrode 30 is disposed above the display panel 28. The display panel 28 is capable of displaying monochrome images or color images, and may be a liquid-crystal panel or an electro-luminescence (EL) panel, for example. The sensor electrode 30 includes a plurality of X-line electrodes and a plurality of Y-line electrodes. The X-line electrodes detect the position on the X-axis of a sensor coordinate system. The Y-line electrodes detect the position on the Y-axis of the sensor coordinate system.

The sensor controller 18 is an integrated circuit configured to provide drive control of the sensor electrode 30. The sensor controller 18 drives the sensor electrode 30 according to a control signal supplied from the host processor 22. In this manner, the sensor controller 18 may execute a "pen detection function" to detect a status of the stylus 16, or a "touch detection function" to detect a touch or contact made by a user, such as by a user's finger.

The pen detection function includes, for example, a function to scan the sensor electrode 30, a function to receive and analyze a downlink signal, a function to estimate the status of the stylus 16 (e.g., a pen position, a pen posture, and a pen pressure), and a function to generate and transmit an uplink signal including a command for the stylus 16. The touch detection function includes, for example, a function to two-dimensionally scan the sensor electrode 30, a function to acquire a detection map of the sensor electrode 30, and a function to classify areas on the detection map (e.g., classifying areas into a finger area and a palm area).

Figure 10A:
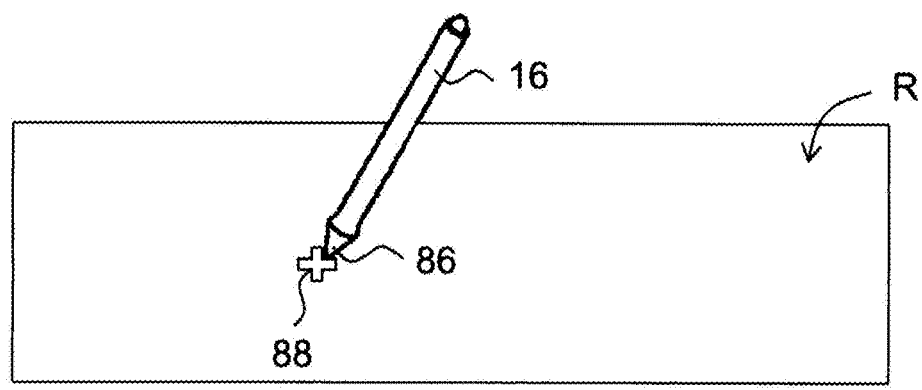
FIGS. 10A and 10B are diagrams illustrating the transition of an image displayed during a stylus operation.
Figure 10B:
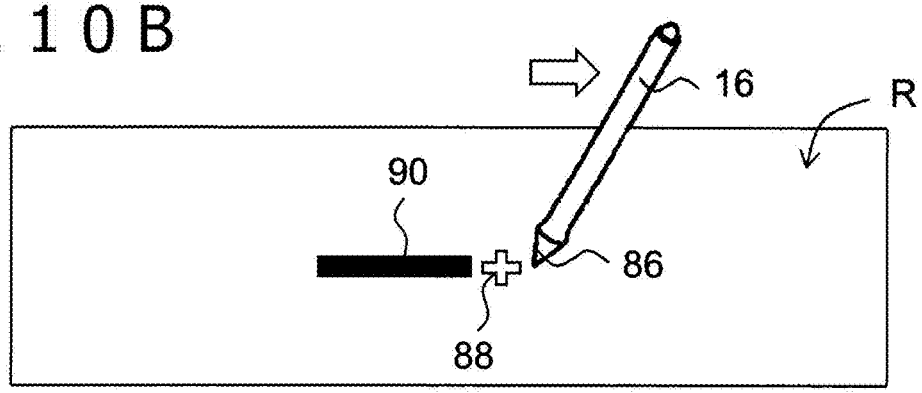

The display controller 20 is an integrated circuit configured to perform drive control of the display panel 28. The display controller 20 drives the display panel 28 according to frame-by-frame image signals supplied from the host processor 22. This results in displaying an image or a video in a display area R of the display panel 28 (see FIGS. 10A and 10B illustrating the display area R, for example). The image or video displayed in this manner may include lines drawn by the user using the stylus 16 in addition to an application window, an icon, a cursor, etc.

As described above, a user interface (hereinafter referred to as the UI section 32) includes a combination of an input function performed by the stylus 16 and the sensor electrode 30 and an output function performed by the display panel 28.

The host processor 22 is a processing arithmetic (computing) unit including a central processing unit (CPU), a microprocessing unit (MPU), and a graphics processing unit (GPU). The host processor 22, by reading and executing a program stored in the memory 24, may execute various functions, such as for digital ink generation, image signal creation, and data transmission/reception control.

As described later, the input system 10 has a technical feature that the sensor controller 18 may be physically or logically connected to the host processor 22 and is physically connected to the display controller 20.

The memory 24 includes a non-transient, computer-readable storage medium. The computer-readable storage medium may be a storage device including a hard disk drive (HDD) or a solid-state drive (SSD), or a portable medium such as a magneto-optical disk, a read only memory (ROM), a compact disk (CD)-ROM, or a flash memory.

The communication module 26 is configured to be capable of establishing a wired or wireless communication link for transmitting and receiving electrical signals to and from an external device. This enables the electronic apparatus 14 to exchange various pieces of data with, for example, a verification server 122 (FIG. 16).

First to third embodiments of the input system 10 depicted in FIG. 1 will now be described with reference to FIGS. 2 to 7. It should be noted that only main elements, namely, the sensor controller 18, the display controller 20, the host processor 22, the display panel 28, and the sensor electrode 30, are depicted in FIGS. 2 to 7 in which other components are omitted.

First Embodiment

Figure 2:
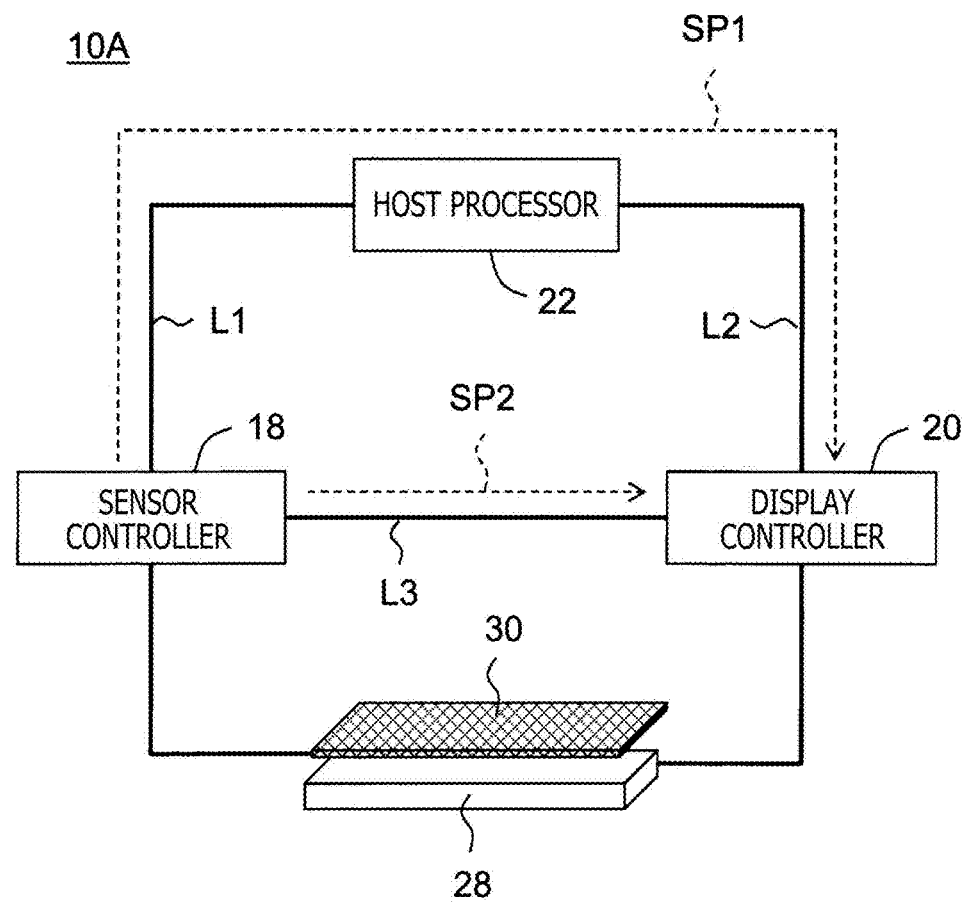
FIG. 2 is a diagram illustrating a connection configuration of the input system according to a first embodiment of the present disclosure.

FIG. 2 is a diagram illustrating a connection configuration of an input system 10A according to the first embodiment of the present disclosure. The sensor controller 18 in the first embodiment is physically connected to the display controller 20 and configured to be capable of switching a data signal output destination between the host processor 22 and the display controller 20.

More specifically, the sensor controller 18, the display controller 20, and the host processor 22 are physically connected by signal lines L1 to L3. The sensor controller 18 is connected to the host processor 22 through the signal line L1. The host processor 22 is connected to the display controller 20 through the signal line L2. The sensor controller 18 is connected to the display controller 20 through the signal line L3. For example, the signal lines L1 and L3 may be compliant with the universal serial bus (USB) standard, and the signal line L2 may be compliant with the low voltage differential signaling (LVDS) standard.

In other words, the signal lines L1 and L2 form a first signal path SP1 for transmitting a signal from the sensor controller 18 to the display controller 20 through the host processor 22. Meanwhile, the signal line L3 forms a second signal path SP2 for transmitting a signal from the sensor controller 18 to the display controller 20 without passing the signal through the host processor 22.

Figure 3:
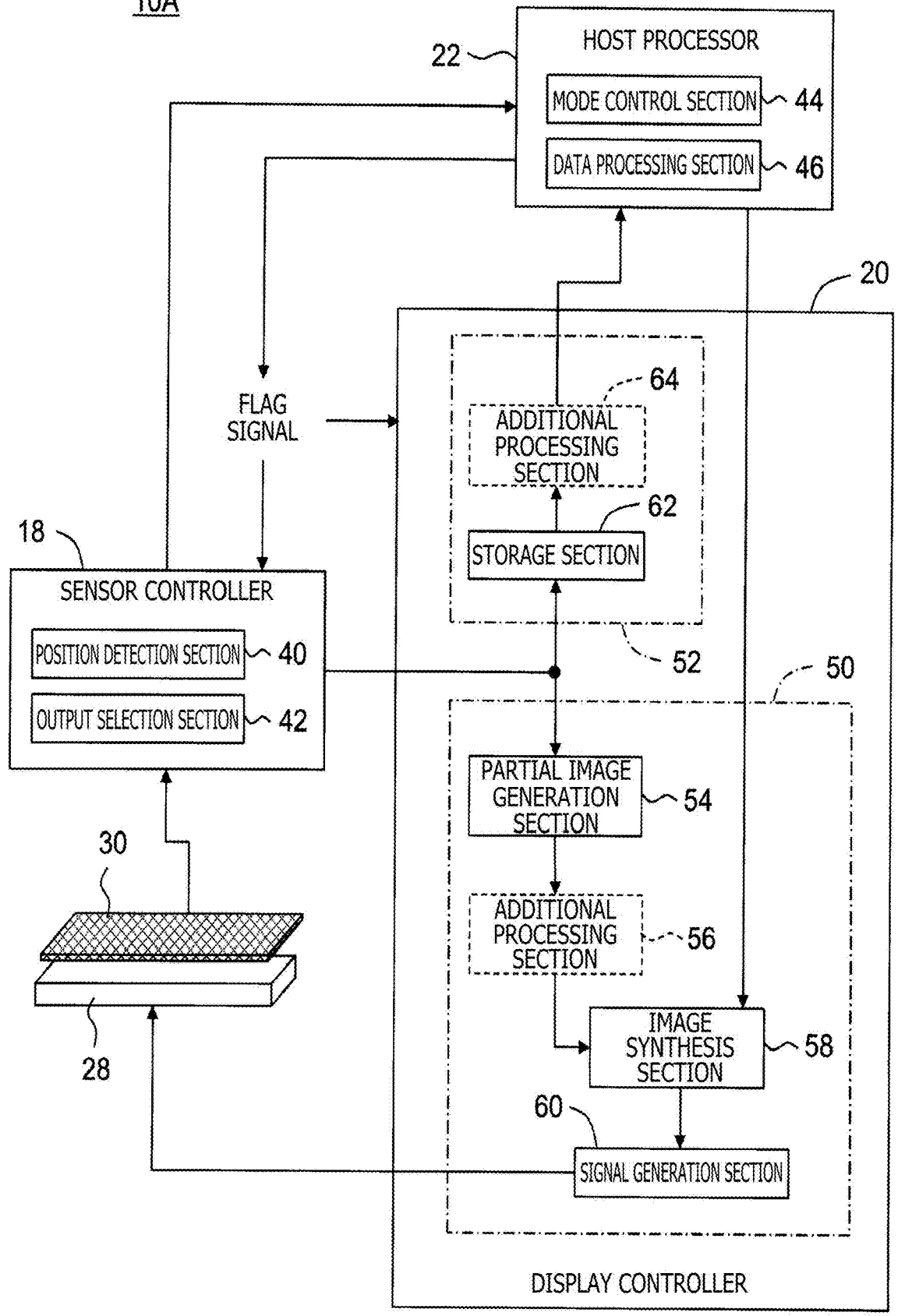
FIG. 3 is a functional block diagram corresponding to FIG. 2.

FIG. 3 is a functional block diagram corresponding to FIG. 2. The sensor controller 18 functions as a position detection section 40 and as an output selection section 42 (switch section or switch circuit). The host processor 22 functions as a mode control section 44 and as a data processing section 46. The display controller 20 functions as two types of output processing sections 50 and 52.

The output processing section of the first type 50 is configured to be capable of executing an output process of outputting a display signal to the display panel 28. More specifically, the output processing section of the first type 50 includes a partial image generation section 54, an additional processing section 56, an image synthesis section 58, and a signal generation section 60. It should be noted that the additional processing section 56 is a functional component which may be optionally included.

The output processing section of the second type 52 is configured to be capable of executing an output process of outputting a data signal to the host processor 22. More specifically, the output processing section of the second type 52 includes a storage section 62 and an additional processing section 64. It should be noted that the additional processing section 64 is a functional component which may be optionally included.

Second Embodiment

Figure 4:
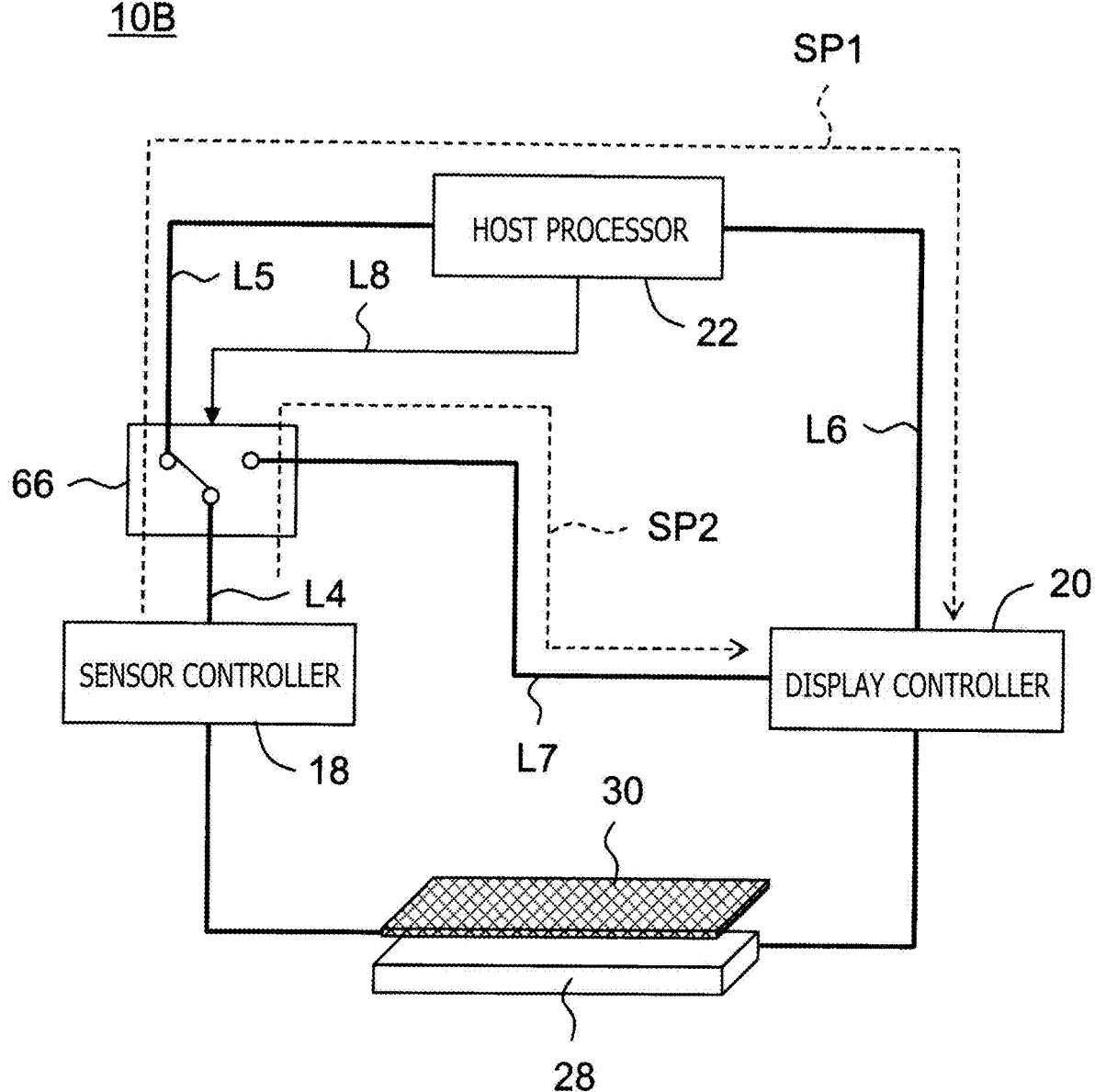
FIG. 4 is a diagram illustrating a connection configuration of an input system according to a second embodiment of the present disclosure.

FIG. 4 is a diagram illustrating a connection configuration of an input system 10B according to the second embodiment of the present disclosure. The input system 10B according to the second embodiment additionally includes a physical switch 66 (switch section or switch circuit) having one input terminal and two output terminals.

More specifically, the sensor controller 18, the display controller 20, the host processor 22, and the physical switch 66 are physically connected by signal lines L4 to L8. The sensor controller 18 is connected to the input terminal of the physical switch 66 through the signal line L4. One output terminal of the physical switch 66 is connected to the host processor 22 through the signal line L5. The host processor 22 is connected to the display controller 20 through the signal line L6. The other output terminal of the physical switch 66 is connected to the display controller 20 through the signal line L7. It should be noted that the signal line L8 is a signal line that the host processor 22 uses to supply a switch signal to the physical switch 66. For example, the signal lines L4, L5, and L7 may be compliant with the USB standard, and the signal line L6 may be compliant with the LVDS standard.

In other words, the signal lines L4, L5, and L6 form the first signal path SP1 for transmitting a signal from the sensor controller 18 to the display controller 20 through the host processor 22. Meanwhile, the signal lines L4 and L7 form the second signal path SP2 for transmitting a signal from the sensor controller 18 to the display controller 20 without passing the signal through the host processor 22.

Figure 5:
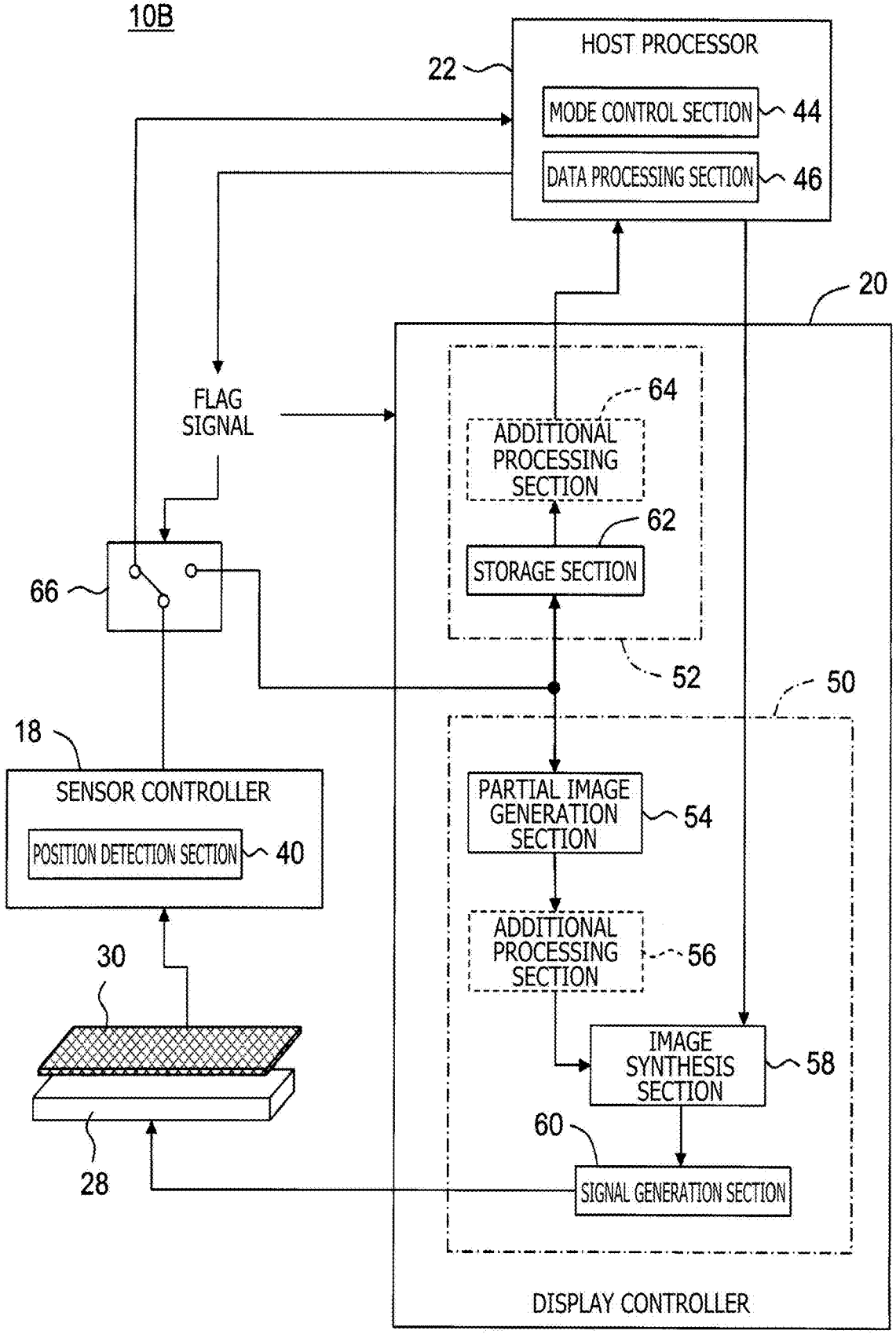
FIG. 5 is a functional block diagram corresponding to FIG. 4.

FIG. 5 is a functional block diagram corresponding to FIG. 4. The sensor controller 18 functions as the position detection section 40. The host processor 22 functions as the mode control section 44 and as the data processing section 46. The display controller 20 functions as the two types of output processing sections 50 and 52. As is understood from FIGS. 3 and 5, the input system 10B differs in configuration from the input system 10A according to the first embodiment in that the sensor controller 18 does not function as the output selection section 42 (see FIG. 3), but instead is provided with the physical switch 66 on the output side of the sensor controller 18.

Third Embodiment

Figure 6:
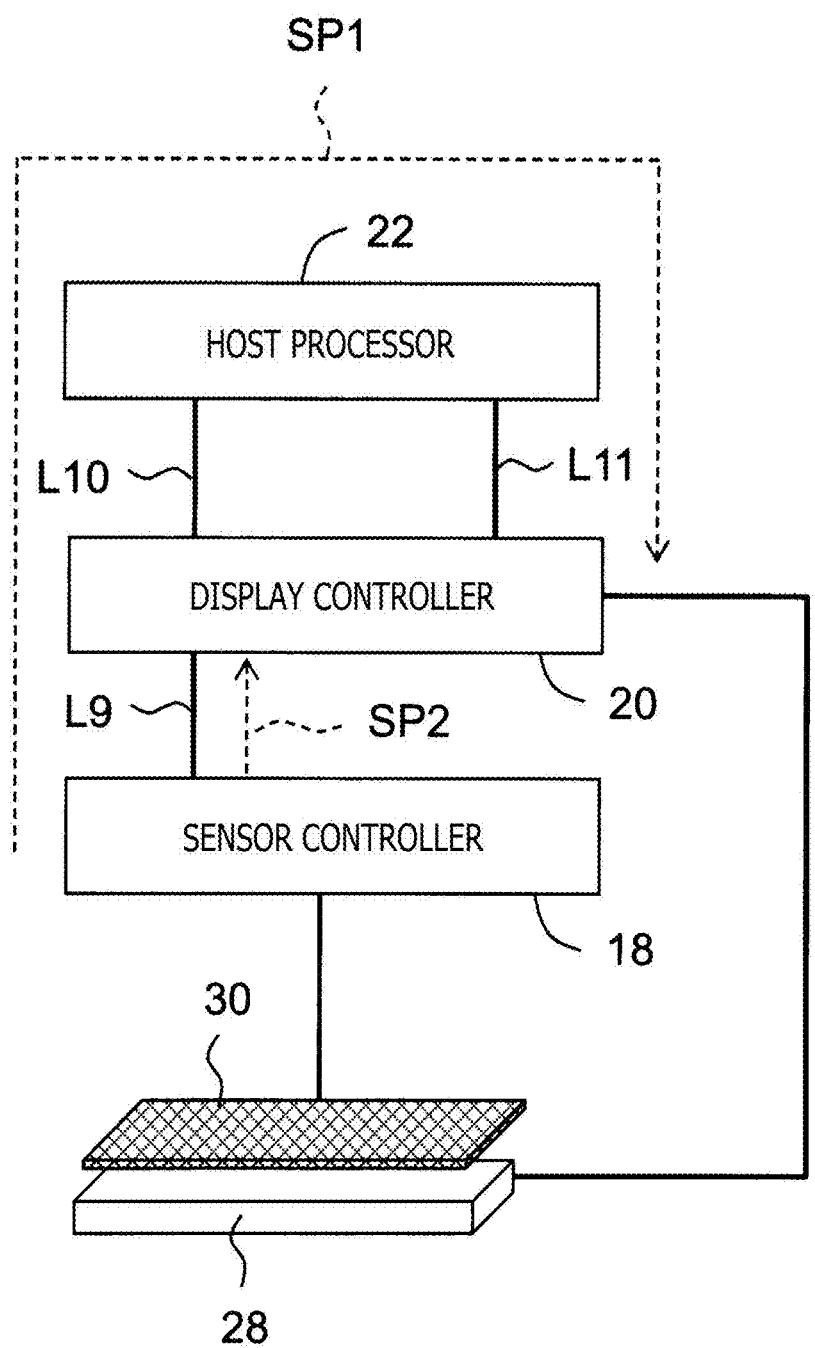
FIG. 6 is a diagram illustrating a connection configuration of an input system according to a third embodiment of the present disclosure.

FIG. 6 is a diagram illustrating a connection configuration of an input system 10C according to the third embodiment of the present disclosure. The display controller 20 in the third embodiment is logically connected to the sensor controller 18 and configured to be capable of switching between performing or not performing a pass-through transmission of supplying a data signal from the sensor controller 18 to the host processor 22.

More specifically, the sensor controller 18, the display controller 20, and the host processor 22 are physically connected by signal lines L9 to L11. The sensor controller 18 is connected to the display controller 20 through the signal line L9. The display controller 20 is connected to the host processor 22 through the signal line L10. The host processor 22 is connected to the display controller 20 through the signal line L11. For example, the signal lines L9 and L10 may be compliant with the USB standard, and the signal line L11 may be compliant with the LVDS standard.

In other words, the signal lines L9, L10, and L11 form the first signal path SP1 for transmitting a signal from the sensor controller 18 to the display controller 20 through the host processor 22. Meanwhile, the signal line L9 forms the second signal path SP2 for transmitting a signal from the sensor controller 18 to the display controller 20 without passing the signal through the host processor 22.

Figure 7:
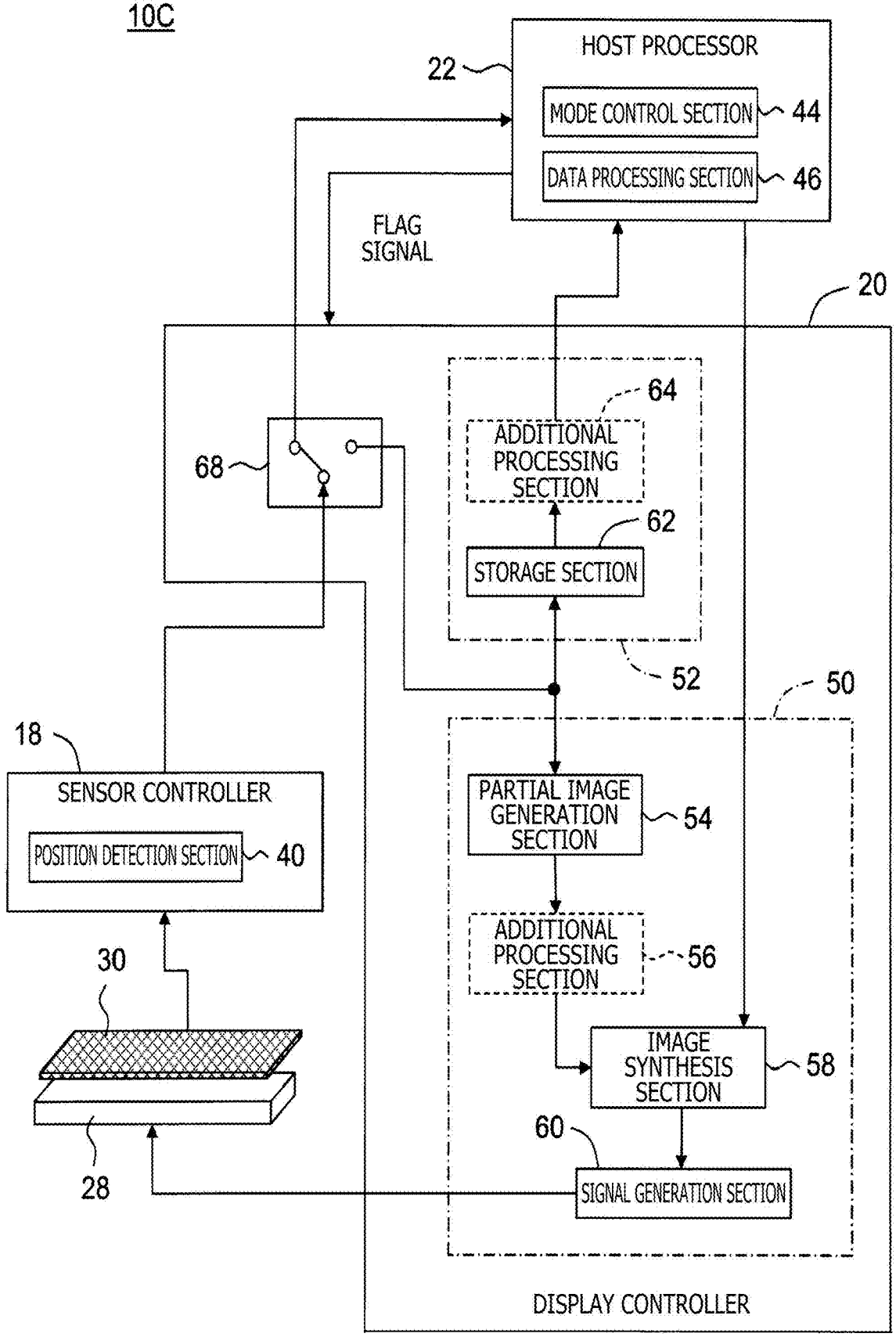
FIG. 7 is a functional block diagram corresponding to FIG. 6.

FIG. 7 is a functional block diagram corresponding to FIG. 6. The sensor controller 18 functions as the position detection section 40. The host processor 22 functions as the mode control section 44 and as the data processing section 46. The display controller 20 functions as the two types of output processing sections 50 and 52 and as a logical switch 68. As is understood from FIGS. 3 and 7, the input system 10C differs in configuration from the input system 10A according to the first embodiment in that the sensor controller 18 does not function as the output selection section 42 (see FIG. 3), but instead functions as the logical switch 68.

Operations of Input System 10

The input system 10 according to the various embodiments of the present disclosure is configured as described above. Operations performed by the input system 10 will now be described with reference to FIGS. 8 to 13A and 13B. The mode control section 44 of the host processor 22 selectively executes a "first output mode" and a "second output mode." The first output mode is selected to perform signal processing by using the first signal path SP1. The second output mode is selected to perform signal processing by using the second signal path SP2.

It should be noted that the input systems 10A, 10B, and 10C are all configured to enable the host processor 22 to function as the mode control section 44. Alternatively, the sensor controller 18 or the display controller 20 may be configured to function as the mode control section 44.

First Output Mode

Figure 8:
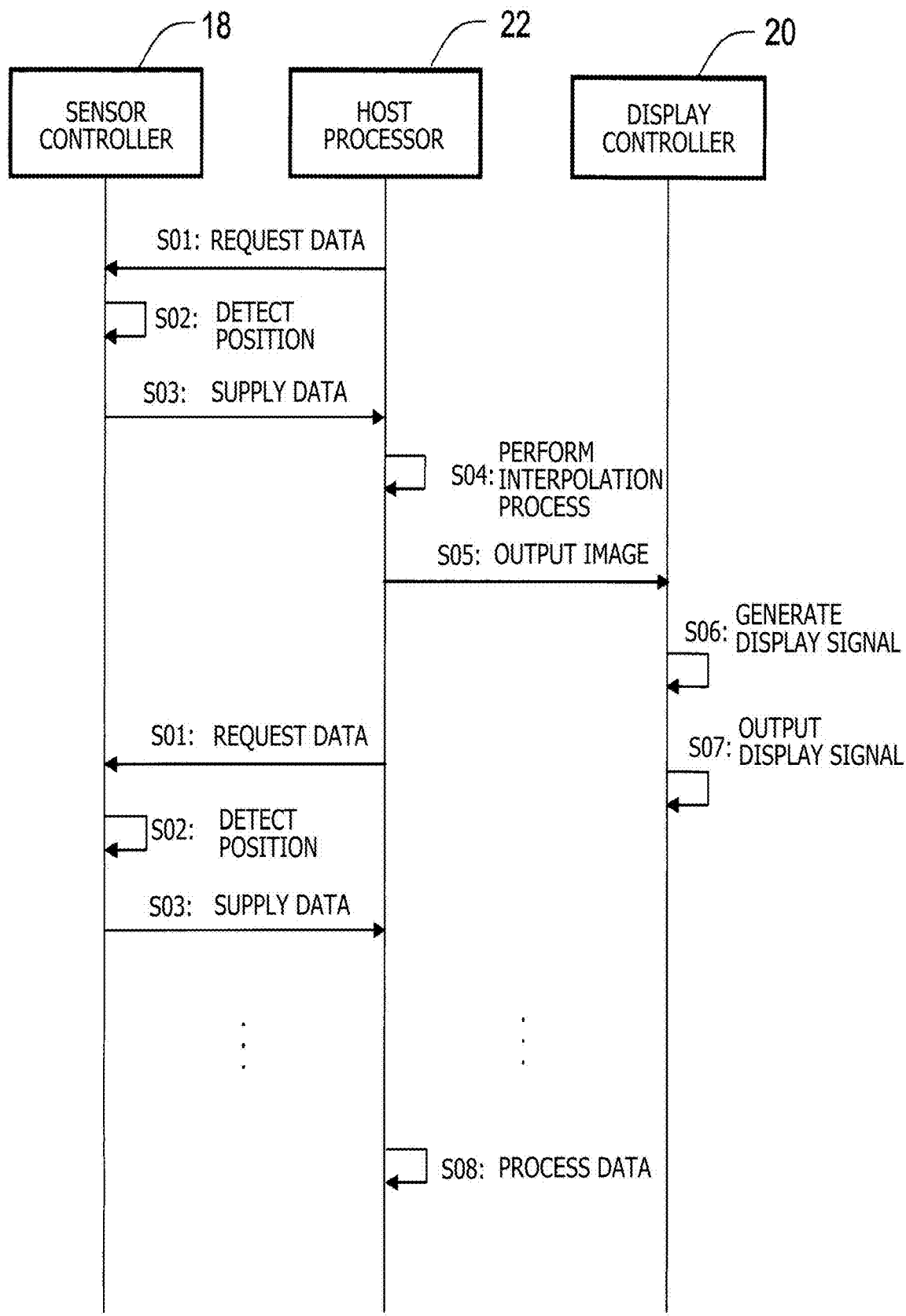
FIG. 8 is a sequence diagram illustrating execution of a first output mode.

FIG. 8 is a sequence diagram illustrating execution of the first output mode. From left to right, the operations of the sensor controller 18, the host processor 22, and the display controller 20 are sequentially depicted in FIG. 8.

In step S01, the host processor 22 outputs, to the sensor controller 18, a signal for requesting written data including a position designated by the stylus 16 (this signal is hereinafter referred to also as a request signal).

After receiving the request signal supplied in step S01, the position detection section 40 of the sensor controller 18 proceeds to step S02 and provides drive control of the sensor electrode 30 in order to detect a position currently designated by the user. This causes the sensor controller 18 to acquire a position in the sensor coordinate system defined in the display area R of the display panel 28.

In step S03, the sensor controller 18 outputs, to the host processor 22, a data signal including the designated position detected in step S02. Before this output, the data signal output destination is switched to the host processor 22 by, for example, the output selection section 42 of the sensor controller 18 in the case of the input system 10A depicted in FIGS. 2 and 3. In the case of the input system 10B depicted in FIGS. 4 and 5, for example, the output terminal of the physical switch 66 is switched to the host processor 22. In the case of the input system 10C depicted in FIGS. 6 and 7, for example, the logical switch 68 of the display controller 20 is switched "ON."

By performing the above switching operation, the sensor controller 18 is capable of selectively outputting the self-generated data signal to the host processor 22. It should be noted that the data signal may include various pieces of information such as information regarding a written status of the stylus 16 (hereinafter referred to as written information) and meta-information regarding the writing of the user. The written information includes, for example, a currently designated position, a pen pressure, and a pen inclination (or a pen tilt). Meanwhile, the meta-information includes, for example, a pen identification (ID), data attributes, a creator (or an author), and a creation date and time.

In step S04, the data processing section 46 of the host processor 22 acquires the written data including the designated position from the data signal supplied in step S03, and performs an interpolation process of updating a trajectory curve 80 by using the acquired currently designated position. The interpolation process is described in detail below with reference to FIGS. 9A and 9B.

Figure 9A:
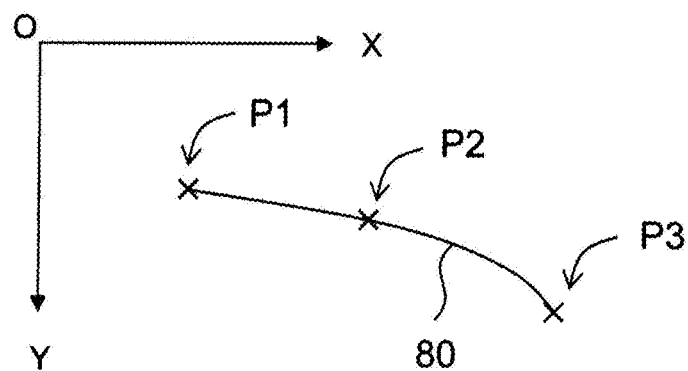
FIGS. 9A and 9B are diagrams illustrating an example of an interpolation process.
Figure 9B:
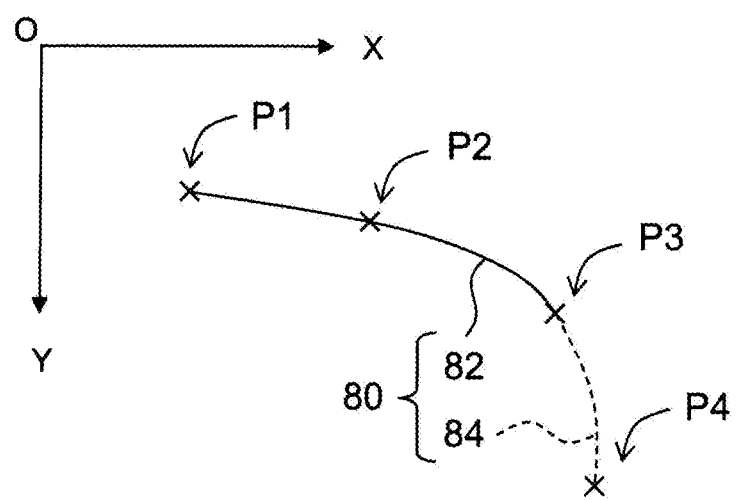

FIGS. 9A and 9B are schematic diagrams illustrating an example of the interpolation process. More specifically, FIG. 9A depicts the shape of an uninterpolated trajectory curve 80, and FIG. 9B depicts the shape of an interpolated trajectory curve 80. It should be noted that an X-Y coordinate system depicted in FIGS. 9A and 9B corresponds to the "sensor coordinate system" for identifying a position detected by the sensor electrode 30, that is, a position designated on the display panel 28.

The trajectory curve 80 depicted in FIG. 9A is a curve obtained by sequentially connecting discrete points P1, P2, and P3, which are previously designated positions. For example, let us assume that a discrete point P4 indicating a currently designated position is added subsequently to the discrete point P3 indicating a previously designated position. In this instance, the data processing section 46 performs an interpolation process of successively connecting the discrete points P3 and P4 by using various methods including linear interpolation and spline interpolation. As a result, as depicted in FIG. 9B, a new trajectory curve 80 is formed by combining a previous trajectory curve 82 passing through the discrete points P1, P2, and P3 with an interpolated curve 84 passing through the discrete points P3 and P4.

The data processing section 46 then generates frame-by-frame image signals by combining a stroke image, with non-written images other than the stroke image (e.g., an application window, a widget, a cursor, an icon, etc.). The stroke image represents a set of strokes 90 (see FIG. 10B) formed by the above-described interpolation process.

In step S05 of FIG. 8, the host processor 22 outputs the image signals generated in step S04 to the display controller 20.

In step S06, the output processing section 50 (more specifically, the signal generation section 60) of the display controller 20 generates the display signal for providing drive control of the display panel 28 by using the image signals supplied in step S05. In the first output mode, the signal generation section 60 generates the display signal by using image signals that have passed through the image synthesis section 58 as is.

In step S07, the output processing section 50 outputs the display signal generated in step S06 to the display panel 28. This results in displaying an overall image including the stroke image in the display area R of the display panel 28.

Subsequently, the input system 10 sequentially repeats steps S01 to S07 at one-frame time intervals.

FIGS. 10A and 10B are diagrams illustrating the transition of an image displayed during the operation of the stylus 16. More specifically, FIG. 10A depicts a stationary state of the stylus 16, and FIG. 10B depicts a moving state of the stylus 16.

As depicted in FIG. 10A, within the display area R, a cursor 88 is displayed at a position corresponding to the position of a pen tip 86 while the stylus 16 is in the stationary state. The user moves the stylus 16 while pressing the pen tip 86 against the touch surface of the electronic apparatus 14. As a result, as depicted in FIG. 10B, an image or a video is successively updated following the pen tip 86 of the stylus 16. More specifically, the cursor 88 moves along the movement path of the stylus 16, and a set of strokes 90 corresponding to the trajectory of the designated position appears and extends.

In step S08 of FIG. 8, at a predetermined processing time point, the data processing section 46 of the host processor 22 performs various processes on the written data successively acquired from the sensor controller 18. The various processes performed in the above instance include, for example, a process of generating digital ink and a process of transmitting data through the communication module 26. Upon completing the above-described processes, the input system 10 terminates the operations based on the first output mode.

Second Output Mode

When the host processor 22 in the electronic apparatus 14 performs processing on data inputted from the touch panel display 12, certain technical or operational inconveniences may occur because the host processor 22 is involved in the processing. In view of such cases, the mode control section 44 of the host processor 22 is capable of mitigating certain inconveniences by switching from the first output mode to the second output mode, as needed.

Figure 11:
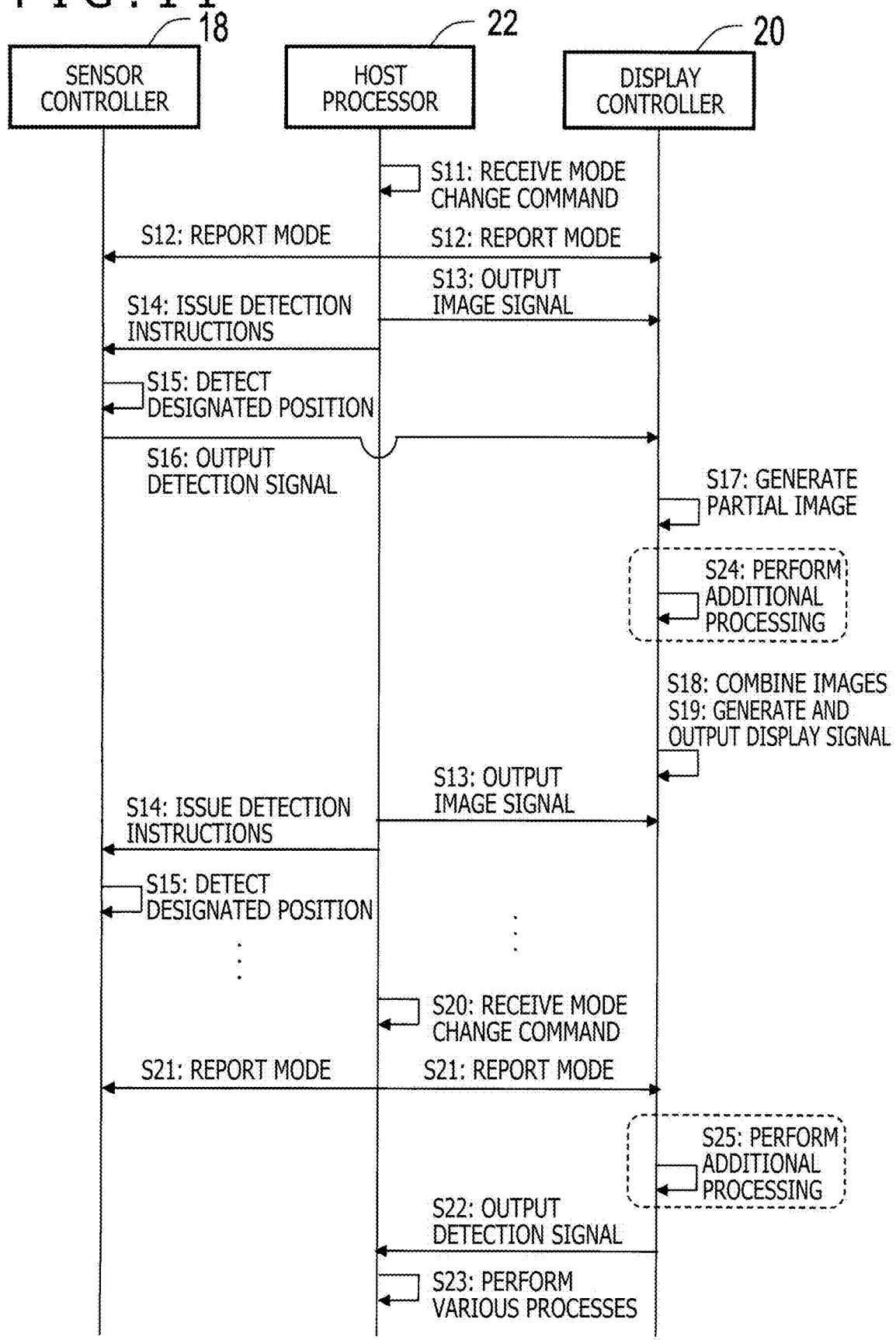
FIG. 11 is a sequence diagram illustrating execution of a second output mode.

FIG. 11 is a sequence diagram illustrating execution of the second output mode. From left to right, the operations of the sensor controller 18, the host processor 22, and the display controller 20 are sequentially depicted in FIG. 11, as is the case with FIG. 8.

In step S11, the host processor 22 receives a command signal for switching from the first output mode to the second output mode. It should be noted that a trigger for generating the command signal will be described later.

In step S12, the host processor 22 outputs a flag signal indicative of the start of execution of the second output mode to various sections involved in a second output mode operation. For example, in the case of the input system 10A depicted in FIGS. 2 and 3, the output destinations of the flag signal are the sensor controller 18 and the display controller 20. In the case of the input system 10B depicted in FIGS. 4 and 5, the output destinations of the flag signal are the display controller 20 and the physical switch 66. In the case of the input system 10C depicted in FIGS. 6 and 7, the output destination of the flag signal is the display controller 20.

In step S13, the data processing section 46 of the host processor 22 generates frame-by-frame image signals representing an overall image Iorg (FIG. 12), and outputs the generated image signals to the display controller 20. It should be noted that, in a case where a write input operation has been performed immediately before switching to the second output mode, the data processing section 46 generates image signals by using the last-updated stroke image.

In step S14, the host processor 22 outputs, to the sensor controller 18, a request signal for requesting written data including a position designated by the stylus 16. This operation is similar to the operation performed in step S01 of FIG. 8.

After receiving the request signal supplied in step S14, the position detection section 40 of the sensor controller 18 proceeds to step S15 and performs an operation for detecting a position currently designated by the user. This operation is similar to the operation performed in step S02 of FIG. 8.

In step S16, the sensor controller 18 outputs, to the display controller 20, a data signal including the currently designated position detected in step S15. Before this output, the data signal output destination is witched to the display controller 20 by, for example, the output selection section 42 of the sensor controller 18 in the case of the input system 10A depicted in FIGS. 2 and 3. In the case of the input system 10B depicted in FIGS. 4 and 5, for example, the output terminal of the physical switch 66 is switched to the display controller 20. In the case of the input system 10C depicted in FIGS. 6 and 7, for example, the logical switch 68 of the display controller 20 is switched "OFF."

By performing the above switching operation, the sensor controller 18 is capable of selectively outputting the self-generated data signal to the display controller 20. It should be noted that the data signal may include the same types of information (e.g., the above-mentioned written information and meta-information) as in the first output mode or include other types of information different from the information in the first output mode.

In step S17, the output processing section 50 (more specifically, the partial image generation section 54) of the display controller 20 acquires written data including the designated position from the data signal supplied in step S16, and generates a partial image Ipar by using the acquired currently designated position. A method of generating the partial image Ipar is described in detail below with reference to FIG. 12.

Figure 12:
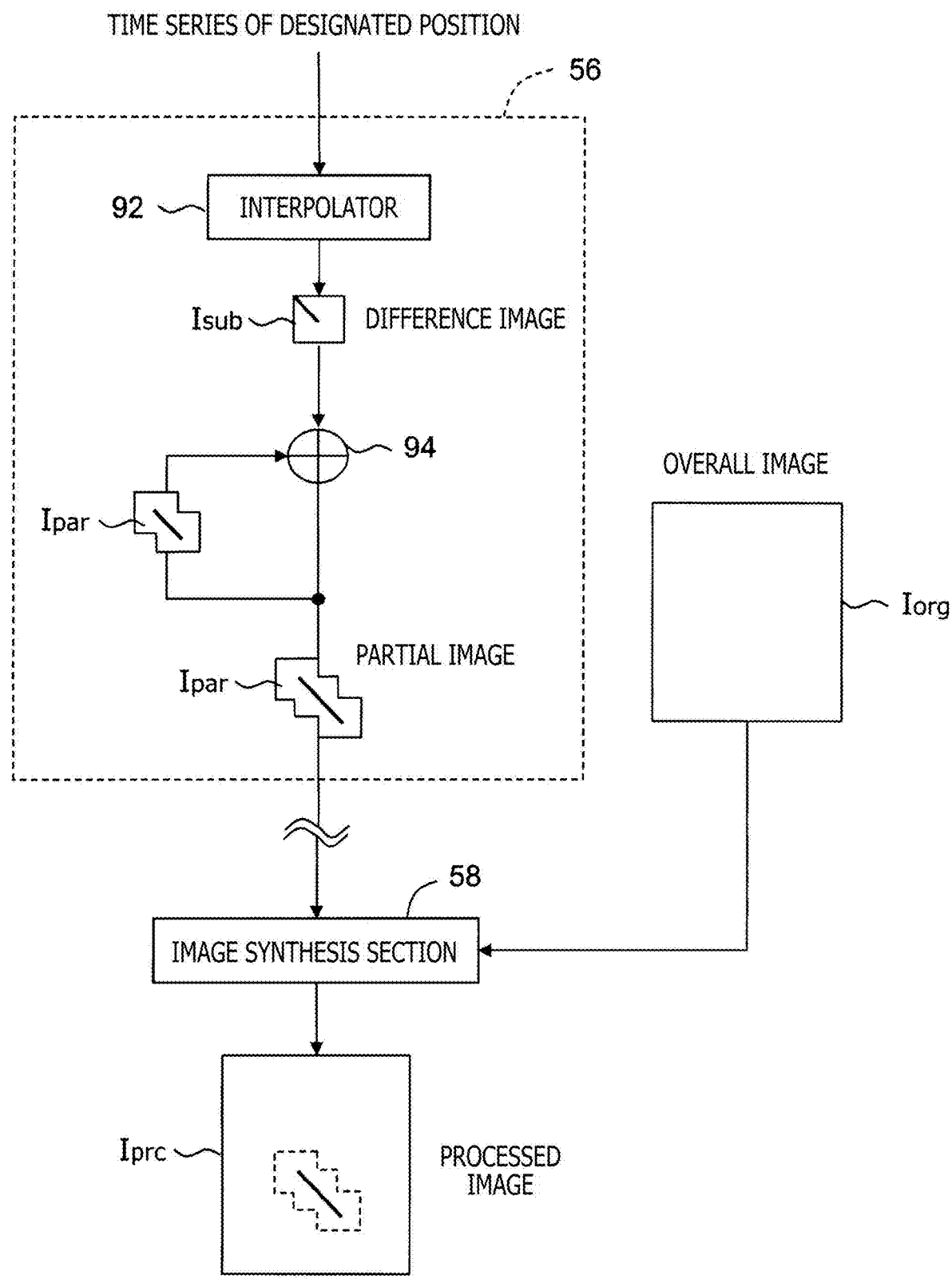
FIG. 12 is a functional block diagram illustrating details of a partial image generation section depicted in FIGS. 3, 5, and 7.

FIG. 12 is a functional block diagram illustrating the details of the partial image generation section 54 depicted in FIGS. 3, 5, and 7. The partial image generation section 54 includes an interpolator 92 and a combiner 94. The interpolator 92 performs an interpolation process. The combiner 94 combines a plurality of small images.

The interpolator 92 generates a small image representing an interpolated curve between two points (the small image is hereinafter referred to as a difference image Isub) by successively connecting two discrete points through the use of a time series of a designated position. The difference image Isub represents the difference between stroke images. In the example of FIG. 9B, the difference image Isub corresponds to an image representing the interpolated curve 84 passing through the discrete points P3 and P4.

The combiner 94 generates an intermediate image representing an aggregate of interpolated curves (the intermediate image is hereinafter referred to as a partial image Ipar) by successively combining the difference images Isub supplied from the interpolator 92. In the example of FIG. 9B, the partial image Ipar corresponds to an image representing the trajectory curve 80 obtained by connecting all the discrete points P1 to P4. The generated partial image Ipar is not only supplied to the image synthesis section 58, but also fed back to the combiner 94.

In this manner, the partial image generation section 54 generates the partial image Ipar including at least the currently designated position, and outputs the generated partial image Ipar to the image synthesis section 58 (step S17).

In step S18 of FIG. 11, the output processing section 50 (more specifically, the image synthesis section 58) combines the overall image Iorg supplied in step S13 with the partial image Ipar generated in step S17. More specifically, the image synthesis section 58 generates a processed image Iprc by replacing an image of a corresponding area of the overall image Iorg, which is supplied once or successively from the host processor 22 (see FIG. 12) with the partial image Ipar. Alternatively, instead of using the overall image Iorg, the image synthesis section 58 may generate the processed image Iprc by performing a padding process on the partial image Ipar so as to fill the remaining display area.

In step S19, the display controller 20 generates a display signal from an image signal representing the processed image Iprc, which is combined in step S18, and outputs the generated display signal to the display panel 28. This operation is similar to the operation performed in steps S06 and S07 of FIG. 8. As a result of this operation, the processed image Iprc including the stroke images appears in the display area R of the display panel 28.

Subsequently, the input system 10 sequentially repeats steps S13 to S19 at one-frame time intervals. It should be noted that, in a case where the overall image Iorg is not to be successively updated, the second and subsequent executions of step S13 may be omitted by allowing the display controller 20 to store one frame of the image signal.

Figure 13A:
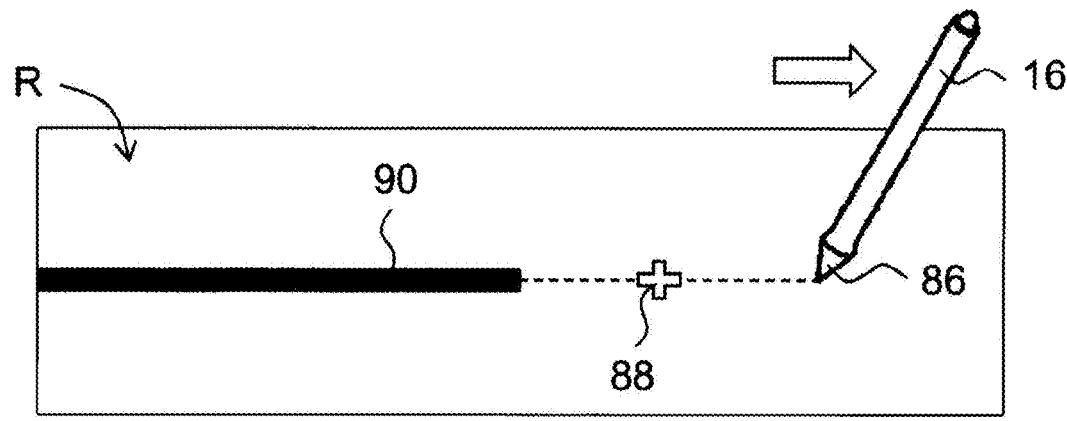
FIGS. 13A and 13B are diagrams for comparing write tracking capabilities with respect to rapid movement of a stylus.
Figure 13B:
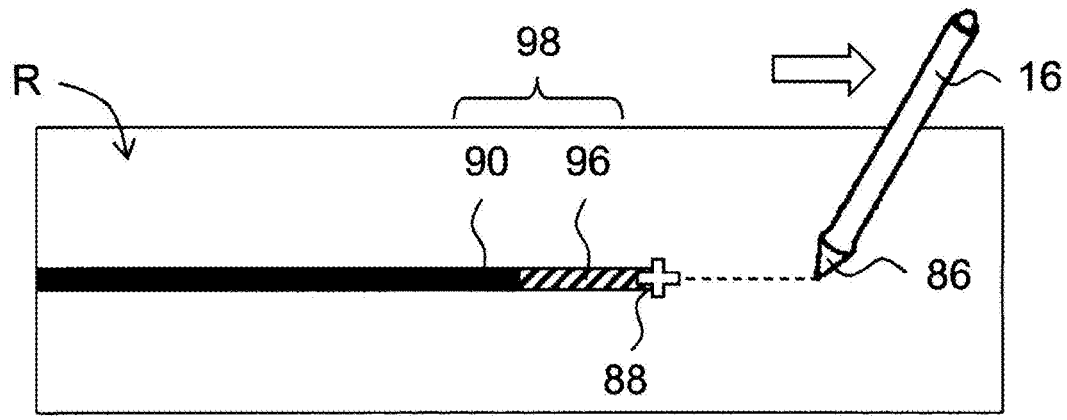

FIGS. 13A and 13B are diagrams which compare write tracking capabilities with respect to rapid movement of the stylus 16. More specifically, FIG. 13A depicts an image displayed when the first output mode is executed, and FIG. 13B depicts an image displayed when the second output mode is executed.

As depicted in FIG. 13A, when the stylus 16 rapidly moves in the first output mode, the position of the cursor 88 is shifted backward from (lags behind) the pen tip 86, and the leading-end position of a stroke 90 is shifted further backward from (lags further behind) the cursor 88. As a result, the user of the stylus 16 may be confused by the unmatched designated position.

The cursor 88 may lag behind due to a response time difference corresponding to a frame interval. Meanwhile, the leading-end position of a stroke may lag behind, for example, when images of the cursor 88 and stroke 90 are respectively created using different designated positions having different acquisition times due to hardware restrictions on data processing and signal transmission.

On the other hand, as depicted in FIG. 13B, when the stylus 16 rapidly moves in the second output mode, a new stroke 98 is formed by adding a line segment 96 to the leading end of the previous stroke 90. In other words, the positional displacement between the cursor 88 and the stroke 98 is essentially resolved although the positional displacement between the pen tip 86 and the cursor 88 remains. This reduces user confusion due to the unmatched designated position, and improves the input system utility accordingly.

In step S20 of FIG. 11, the host processor 22 receives a command signal for switching from the second output mode to the first output mode. It should be noted that a trigger for generating the command signal will be described later.

In step S21, the host processor 22 outputs a flag signal indicative of the start of execution of the first output mode to various sections involved in a first output mode operation. For example, in the case of the input system 10A depicted in FIGS. 2 and 3, the output destinations of the flag signal are the sensor controller 18 and the display controller 20. In the case of the input system 10B depicted in FIGS. 4 and 5, the output destinations of the flag signal are the display controller 20 and the physical switch 66. In the case of the input system 10C depicted in FIGS. 6 and 7, the output destination of the flag signal is the display controller 20.

In step S22, the output processing section 52 of the display controller 20 reads data temporarily stored in the storage section 62, and outputs data signals including the time series of the designated position all at once to the host processor 22.

In step S23, the data processing section 46 of the host processor 22 acquires a group of written data from the data signals supplied in step S22, and performs various processes on the acquired written data. For example, the data processing section 46 may merge the written data already acquired in the first output mode with the written data newly acquired in the second output mode, and then perform the process of generating digital ink and the process of transmitting data. Upon completing the above-described processes, the input system 10 terminates the operations based on the second output mode.

Effects of Input System 10

As described above, the input system 10 uses the touch panel display 12, which is configured such that the sensor electrode 30 for detecting the user-designated position is disposed in the display area R of the display panel 28. The input system 10 includes the sensor controller 18, the host processor 22, the display controller 20, the first signal path SP1, the second signal path SP2, and the switch section (e.g., the output selection section 42, the physical switch 66, and the logical switch 68). The sensor controller 18 acquires a designated position in the display area R according to the result of detection by the sensor electrode 30. The host processor 22 processes a data signal including the acquired designated position. The display controller 20 outputs a display signal representing an image or a video to the display panel 28. The first signal path SP1 is used for transmitting a signal from the sensor controller 18 to the display controller 20 through the host processor 22. The second signal path SP2 is used for transmitting a signal from the sensor controller 18 to the display controller 20 without passing the signal through the host processor 22. The switch section is configured to be able to switch between the first signal path SP1 and the second signal path SP2.

Because the input system 10 includes the switch section that is capable of switching between the first signal path SP1 and the second signal path SP2, by selecting the second signal path SP2 it becomes possible to execute data processing in a timely manner without passing a signal through the host processor 22. This mitigates certain inconveniences that may arise due to data processing performed by the host processor 22.

The mode control section 44 may selectively execute the first output mode and the second output mode. In the first output mode, the switch section selects the first signal path SP1. In the second output mode, the switch section selects the second signal path SP2. While the first output mode is executed, the display controller 20 generates the display signal by using a signal passed through the first signal path SP1, and outputs the generated display signal to the display panel 28. While the second output mode is executed, the display controller 20 performs a predetermined process on a data signal passed through the second signal path SP2, and outputs the processed display signal to the display panel 28. Using the second signal path SP2 which is shorter than the first signal path SP1 improves time response related to display processing.

Furthermore, while the second output mode is executed, the host processor 22 may output an image signal representing the overall image Iorg corresponding to the display area R to the display controller 20, and allow the display controller 20 to successively acquire designated positions from data signals passed through the second signal path SP2, generate the processed image Iprc by changing a portion of the overall image Iorg that includes at least a currently designated position, and output a display signal representing the generated processed image Iprc to the display panel 28. This alternative is implemented simply by adding, to the first output mode, a predetermined process of changing only the portion including the currently designated position. As a result, an excessive increase in processing load on the display controller 20 may be avoided.

Moreover, the display controller 20 may generate the partial image Ipar including the stroke 98 (the trajectory of a designated position) from the time series of a data signal passed through the second signal path SP2, and combine the generated partial image Ipar with the overall image Iorg to generate the processed image Iprc. This alternative is implemented simply by adding, to the first output mode, a predetermined process of generating the stroke 98 to combine the images. As a result, an excessive increase in the processing load on the display controller 20 may be avoided.

Specific Examples of Mode Switching

Specific examples of output mode switching timing will now be described. The mode control section 44 of the host processor 22 may receive a command signal that is triggered by a user operation (steps S11 and S20 of FIG. 11). This enables the user to recognize the status of the output mode through the user's operation.

An operation for switching from the first output mode to the second output mode is hereinafter referred to as the "first operation," and an operation for switching from the second output mode to the first output mode is hereinafter referred to as the "second operation." The second operation may entail the same operation or a different operation as the first operation. Further, the first operation and the second operation may be a hardware operation or a software operation.

The hardware operation includes a push-down operation performed on a hardware button (a so-called function switch) included in the electronic apparatus 14 or the stylus 16 or a pen-down/pen-up operation performed on the stylus 16. The pen-down/pen-up operation is detected by an undepicted pen pressure sensor disposed on the pen tip 86. Meanwhile, the software operation includes a specific operation for causing a state transition of an application started by the host processor 22, such as an operation of an on-screen user control or an operation for opening/changing an application window.

For example, the first operation may be a pen-down operation of the stylus 16, and the second operation may be a pen-up operation corresponding to the pen-down operation. This makes it possible to switch the output mode in a timely manner each time a series of stroke operations is performed.

The mode control section 44 may prohibit switching from the first output mode to the second output mode while a contact state of the stylus 16 is detected, even when the first operation is received. Additionally or alternatively, the mode control section 44 may prohibit switching from the second output mode to the first output mode while the contact state of the stylus 16 is detected, even when the second operation is received. This will prevent a group of written data indicative of one stroke 90 from being divided and separately transmitted to the host processor 22 and the display controller 20.

The mode control section 44 may selectively execute the first output mode and the second output mode according to the status of an application executed by the host processor 22. This makes it possible to switch the output mode in a timely manner in coordination with the application.

Additional Processing

In a case where the user writes confidential or proprietary information such as secret information or copyrightable information through the UI section 32, operational inconveniences may arise from the confidential or proprietary nature of the written information. Such operational inconveniences may be mitigated by use of the second output mode, as needed. Additional processing performed by the output processing sections 50 and 52 (additional processing sections 56 and 64) of the display controller 20 is described below with reference to FIGS. 14A to 14D to FIG. 16.

1. Protection of Visible Information

If confidential information written by the user remains displayed as is on the display panel 28, an unauthorized third party may view the content of the written confidential information. Thus, the output processing section 50 (more specifically, the additional processing section 56) may perform additional processing for protecting visible information. In this case, step S24, which is described below, should be additionally performed between steps S17 and S18 of FIG. 11.

In step S24, the additional processing section 56 performs additional processing on the partial image Ipar obtained in step S17 for the purpose of protecting the visible information. As the additional processing, for example, a concealment (hiding) process, an unsharpening (blurring) process, an information attachment process, or the like may be performed. Examples of effects produced by the additional processing are described below with reference to FIGS. 14A to 14D and FIG. 15.

Figure 14A:
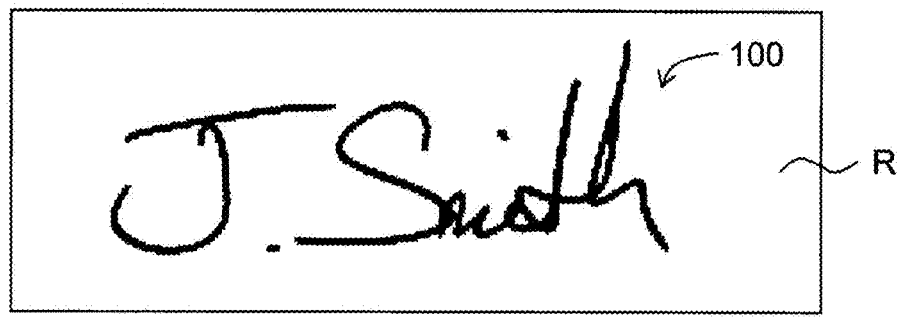
FIGS. 14A to 14D are diagrams illustrating examples of effects produced by additional processing.

As depicted in FIG. 14A, content 100 representing a signature of the user is displayed in the display area R. A handwritten name or signature of the user is a part of personal information. In addition, the personal information may be identified from the content of a signed electronic document. Thus, temporal changes may be applied to a display mode of the content 100 during or after signing.

Figure 14B:
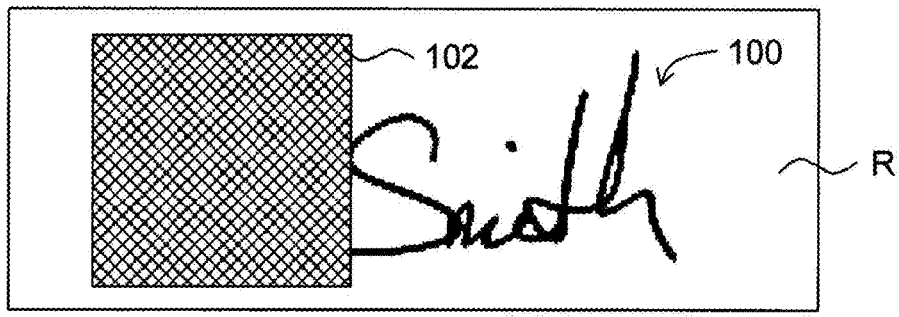
Figure 14C:
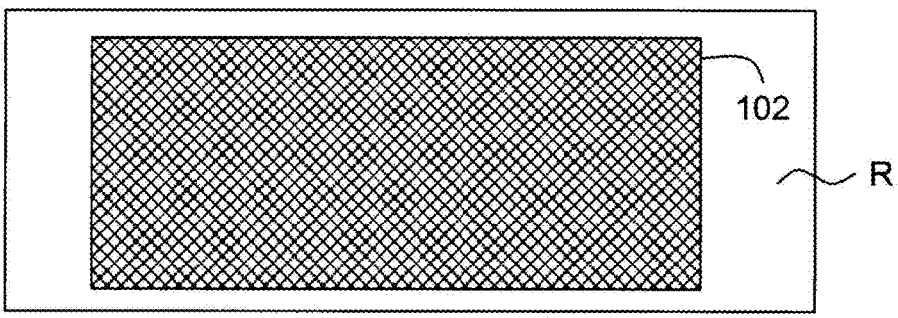

After a predetermined period of time (e.g., 10 seconds) has elapsed from the end of signing, a masked area 102 may appear from the left side of the content 100, as depicted in FIG. 14B, in order to conceal (hide) a part of the content 100. The masked area 102 enlarges with time, and eventually conceals the whole of the content 100 as depicted in FIG. 14C.

Figure 14D:
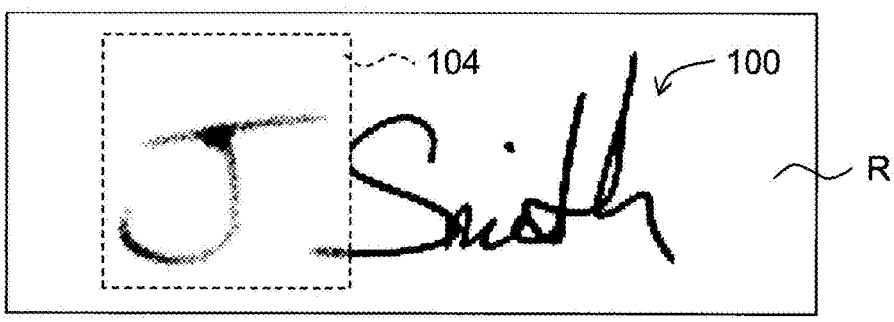

Alternatively, the unsharpening (blurring) process may be performed on an unsharpening area 104, as depicted in FIG. 14D, in order to reduce the visibility of the whole or a part of the content 100. It should be noted that various processes of producing visual effects for relatively reducing the visibility to a viewer may be used in addition to the unsharpening process.

In this manner, the display controller 20 may generate the partial image Ipar, which is obtained by concealing or unsharpening the content 100 (the trajectory of a designated position) represented by the time series of a data signal passed through the second signal path SP2, and combine the generated partial image Ipar with the overall image Iorg to generate the processed image Iprc that is obtained by concealing or unsharpening at least a part of the content. This makes it possible to reduce or suppress the visibility of the partial image Ipar and avoid information leak to an unauthorized third party.

Figure 15:
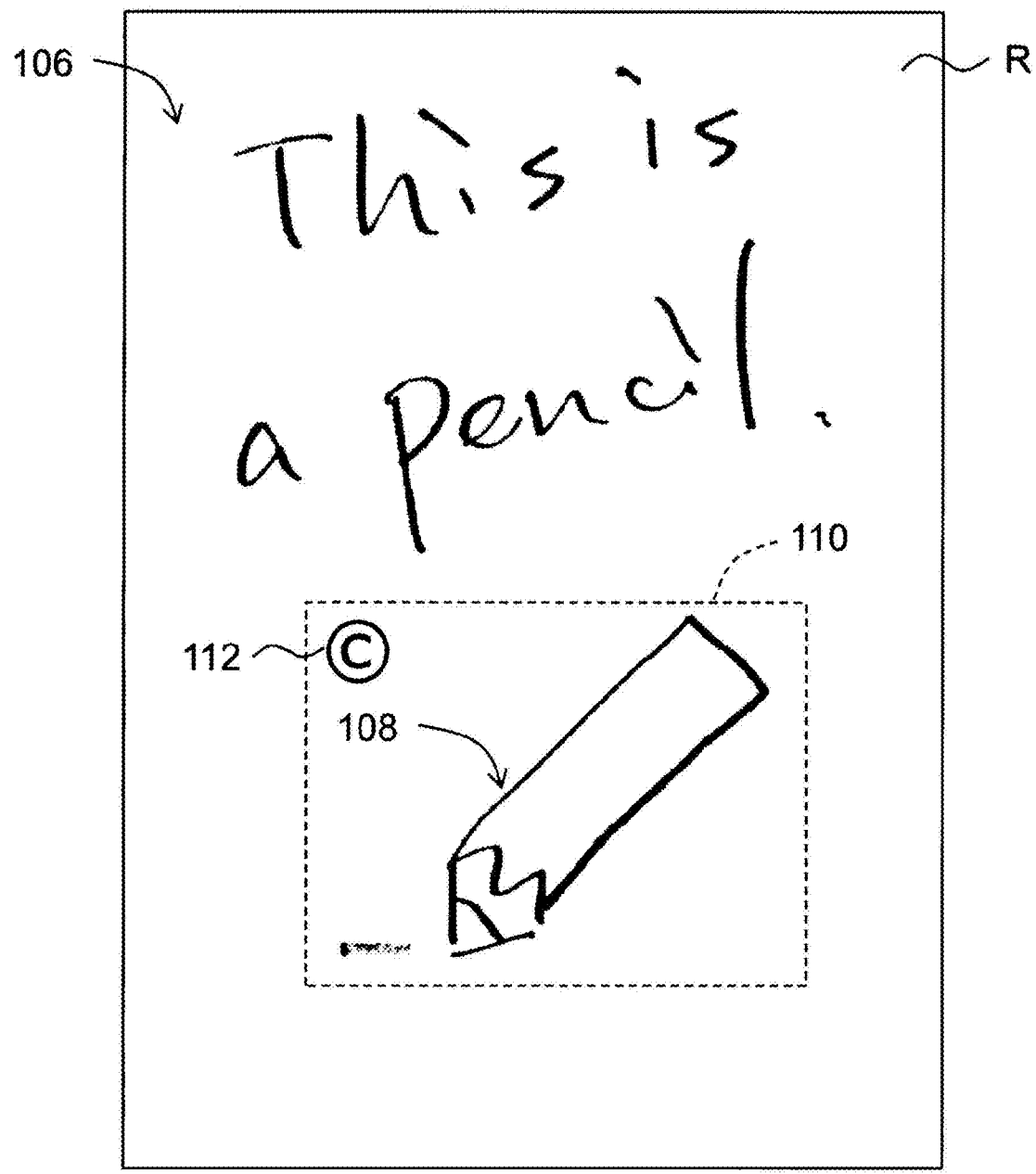
FIG. 15 is a diagram illustrating an example of an effect produced by the additional processing.

As depicted in FIG. 15, content 106, which includes the character string "This is a pencil." and a picture of a pencil, is displayed in the display area R. It is possible that the content 106 may include secret or copyrighted content (hereinafter referred to as the specific content 108). Therefore, a copyright symbol 112 for clearly indicating the copyrighted nature of the content may be displayed at a position near the specific content 108 within a user-designated area 110. Alternatively or additionally to the copyright symbol 112, a label indicating the confidential nature of the content imposing a confidentiality obligation may be displayed.

In this manner, the display controller 20 may generate the partial image Ipar in which information indicative of the secret or copyrightable nature of the content (e.g., copyright symbol 112) is attached in the vicinity of the specific content 108 (the trajectory of a designated position) represented by the time series of a data signal passed through the second signal path SP2, and combine the generated partial image Ipar with the overall image Iorg to generate the processed image Iprc, wherein the information indicative of the secret or copyrightable nature is attached to at least a part of the content. This effectively inhibits information leak due to an unauthorized third party viewing the partial image Ipar.

2. Protection of Data

When the security of the electronic apparatus 14 is breached, for example, it is highly possible that the written data may be leaked, falsified, damaged, or otherwise tampered with through the host processor 22. Therefore, the display controller 20 may successively acquire the written data, including the written information regarding the written status of the stylus 16 and the meta-information regarding the writing of the user, from a data signal that has passed through the second signal path SP2 during the execution of the second output mode, and output, to the host processor 22, a data signal including the time series of the written data subjected to predetermined processing.

Accordingly, the output processing section 52 (more specifically, the additional processing section 56) performs additional processing for protecting data. In this case, step S25, which is described below, should be additionally performed between steps S21 and S22 of FIG. 11.

In step S25, the additional processing section 64 reads data temporarily stored in the storage section 62 and performs additional processing for protecting the data. As the additional processing, for example, an irreversible process, an attachment process, an encryption process, or the like may be performed.

Here, the "irreversible process" means a process of causing an irreversible loss of at least one of the written information and the meta-information. As the irreversible process, for example, a process of deleting a pen ID, deleting a pen pressure, thinning out or smoothing a data string, concealing a stroke order, unsharpening a stroke, rasterizing an image, adding redundant information, or the like may be performed.

The "attachment process" denotes a process of attaching information indicative of the secret or copyrightable nature of content to the time series of written data. As the attachment process, for example, a process of adding a tag or embedding visible information including a mark (or label) may be performed.

The "encryption process" may be performed by using various methods including a public key method, an encryption key method, and a common key method. A concrete example of the encryption process is described below with reference to FIG. 16.

FIG. 16 is a diagram illustrating an overall configuration of a signature verification system 120 incorporating the input system 10 depicted in FIG. 1. The signature verification system 120 includes a verification server 122 in addition to the electronic apparatus 14 and the stylus 16. The electronic apparatus 14 is connected to a card reader 126 that is capable of reading a credit card 124. Further, the electronic apparatus 14 is capable of establishing a bidirectional communication link with the verification server 122 through a relay apparatus 128 and a network NW.

The electronic apparatus 14 acquires, through the card reader 126, an encryption key Ken stored in the credit card 124, and temporarily stores the acquired encryption key Ken in the memory 24. The host processor 22 reads the encryption key Ken at a desired processing time point, performs the encryption process on written data to obtain encrypted data D1, and outputs the encrypted data D1 to the host processor 22. The host processor 22 performs a process of transmitting the encrypted data D1 to the verification server 122 through the communication module 26.

The verification server 122 then performs a decryption process on the encrypted data D1 from the electronic apparatus 14 by using a decryption key Kde corresponding to the encryption key Ken. This enables the verification server 122 to acquire signature data D2 indicative of the signature of the user and verify the validity of the signature.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic apparatus capable of visually displaying, on a display panel, content input by a user, the electronic apparatus comprising:
a display controller that performs drive control of the display panel;
a sensor controller that acquires a data signal input by the user via a sensor;
wherein the sensor controller outputs the data signal to the display controller;
a host processor that processes the data signal including a designated position acquired by the sensor controller;
a first signal path that is used for transmitting the data signal from the sensor controller to the display controller through the host processor;
a second signal path that is used for transmitting the data signal from the sensor controller to the display controller without passing the data signal through the host processor;
a switch section that is configured to be able to switch between the first signal path and the second signal path; and
a mode control section that selectively executes a first output mode and a second output mode for the switch section.

2. The electronic apparatus according to claim 1, wherein, the first output mode causes the switch section to select the first signal path; and
the second output mode causes the switch section to select the second signal path.

3. The electronic apparatus according to claim 1, wherein, in the first output mode, the display controller generates a display signal by using the data signal passed through the first signal path, and outputs the display signal to the display panel; and
in the second output mode, the display controller performs a predetermined process on the data signal passed through the second signal path, and either outputs a processed display signal to the display panel or outputs a processed data signal to the host processor.

4. The electronic apparatus according to claim 1, wherein, in the second output mode,
the host processor outputs, to the display controller, an image signal representing an overall image for the display panel; and
the display controller successively acquires designated positions from the data signal passed through the second signal path, generates a processed image by changing a portion of the overall image that includes at least a currently designated position, and outputs a display signal representing the processed image to the display panel.

5. The electronic apparatus according to claim 4, wherein the display controller generates a partial image including a trajectory of the designated position from a time series of the data signal passed through the second signal path, and combines the partial image with the overall image to generate the processed image.

6. The electronic apparatus according to claim 4, wherein the display controller generates a partial image which conceals or un-sharpens a trajectory of the designated position indicated by a time series of the data signal passed through the second signal path, and combines the partial image with the overall image to generate the processed image which conceals or un-sharpens the trajectory of at least some of the designated positions.

7. The electronic apparatus according to claim 1, wherein, when the user performs a first operation, the mode control section is triggered to switch from the first output mode to the second output mode and to execute the second output mode; and
when the user performs a second operation, the mode control section is triggered to switch from the second output mode to the first output mode and to execute the first output mode.

8. The electronic apparatus according to claim 7, wherein, the first operation is a pen-down operation of a stylus; and
the second operation is a pen-up operation which corresponds to the pen-down operation.

9. The electronic apparatus according to claim 1, wherein, while a contact state of a stylus is detected, the mode control section prohibits switching from the first output mode to the second output mode and/or prohibits switching from the second output mode to the first output mode.

10. The electronic apparatus according to claim 1, wherein the mode control section selectively executes the first output mode and the second output mode according to a status of an application executed by the host processor.

11. The electronic apparatus according to claim 1, wherein the display controller successively acquires written data from the data signal passed through the second signal path in the second output mode, wherein the written data includes writing information regarding a writing status of a stylus and meta information regarding the user's writing, and outputs, to the host processor, a time series of the written data.

12. The electronic apparatus according to claim 11, wherein the display controller performs an irreversible process of causing an irreversible loss of at least one of the writing information or the meta information.

13. The electronic apparatus according to claim 11, wherein the display controller performs an attachment process of attaching information indicative of a secret or copyrightable nature of content to the time series of the written data.

14. The electronic apparatus according to claim 11, wherein the display controller performs an encryption process on the time series of the written data.

\* \* \* \* \*